D. G. LITTLEFIELD.

2 Sheets—Sheet 1.

Stove.

No. 1,333.

Reissued Aug. 26, 1862.

WITNESSES

Franklin Scott

Marcus P. Norton

INVENTOR,

Dennis G. Littlefield

N. PETERS, Photo-Lithographer, Washington, D. C.

2 Sheets—Sheet 2.
D. G. LITTLEFIELD.
Stove.
No. 1,333.
Reissued Aug. 26, 1862.
Fig. 9
vertical Section
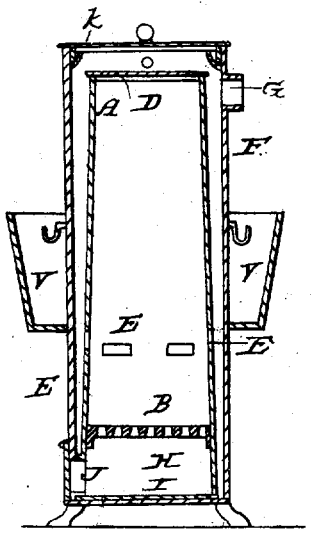
Fig. 3
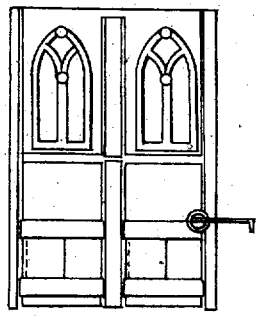
Fig. 10
Horizontal Section
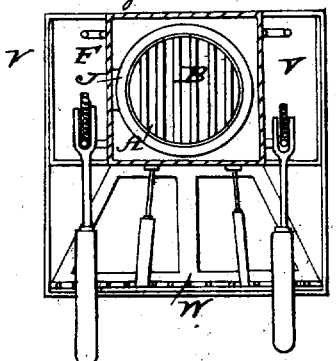
Fig. 11
Front elevation of the stove
A.
Fig. 9 & 10
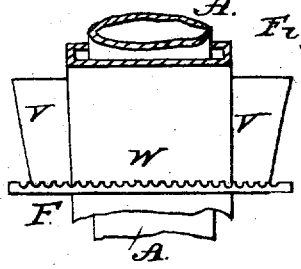
Witnesses
Franklin Flott
Marcus P. Norton
Inventor
Dennis G. Littlefield
N. PETERS, Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861; Reissue No. 1,333, dated August 26, 1862.

DIVISION NO. 3.

*To all whom it may concern:*

Be it known that I, DENNIS G. LITTLEFIELD, of the city and county of Albany, State of New York, did, on or about the 24th day of January, 1854, obtain of and from the United States of America certain Letters Patent for and upon a new method of constructing that class of stoves using a supplying-cylinder for the reserve coal, which said patent was duly reissued in two separate divisions or patents on the 19th day of November, 1861; and I do hereby declare that the following is a full and exact description of my invention, reference being had to the accompanying drawings, and to the letters of reference marked thereon.

Like letters represent and refer to like or corresponding parts.

Figure 2:
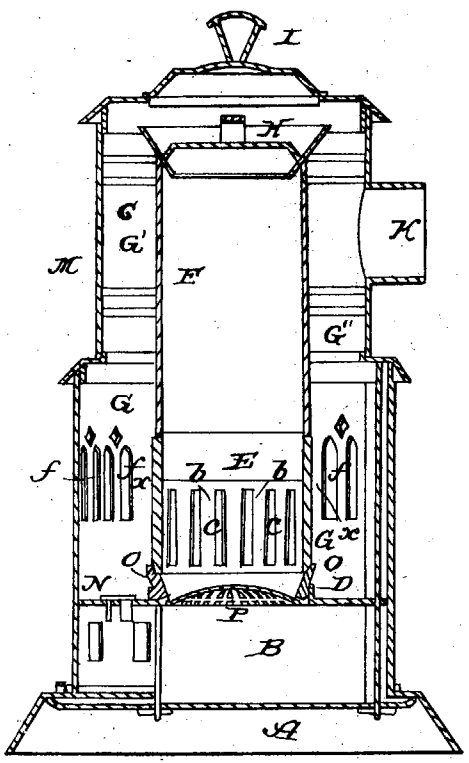
Figure 1:
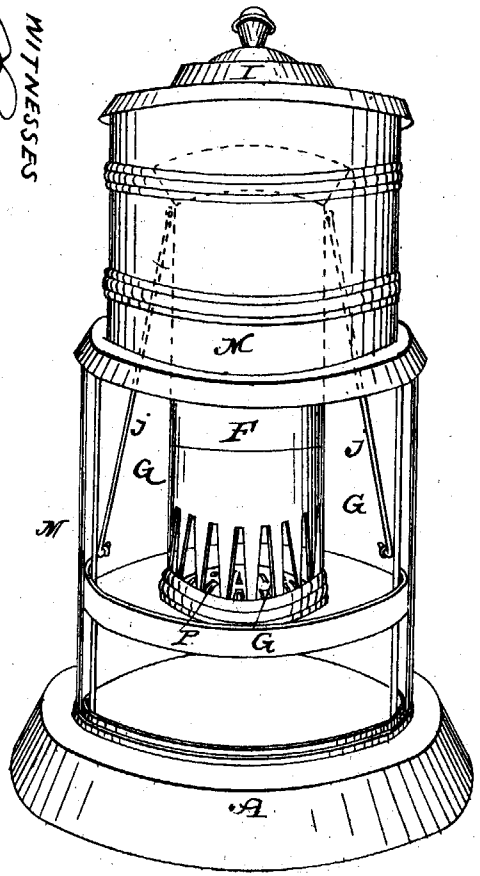

Figure 1 is a view of a cylindrical stove, a part of the outer cylinder being removed. Fig. 2 is a central vertical section of the same, and showing the arrangement and combination of the various parts of the stove hereinafter described.

The nature of my invention consists in the employment of a grated fire-pot, with no solid or imperforated sides against which the partially-consumed coals can rest and cool, which fire-pot is surmounted by a reservoir for the reception of the gases arising from the burning coal. The said reservoir serves also to contain a supply of fuel, and being closed at the top, gas cannot escape therefrom, but is forced to return downward to the grated fire-pot, where the solid unconsumed coal is in a state of ignition, whereby the combustion of the same is greatly facilitated.

To enable others skilled in the art to make and use my invention, I will here proceed to describe its construction and operation, which is as follows, to wit: I construct a fire-pot with openings on every side thereof, forming a vertical fire-grate, with bars *b* of any form or shape desired and extending from the lower end of the fire-pot E, Figs. 1 and 2, upward to any height required. The spaces or openings *c* may also be of any shape or form desired, and of such size as deemed best to accomplish the end desired, while the height thereof will correspond to the height of the grate-bars *b* aforesaid. This fire-pot may be of any size required, and the said vertical grate at the lower end thereof will regulate the height of the incandescent coal within said fire-pot, for the gases in the coal-supply chamber F will not ignite until they come in contact with the draft of air entering the bottom of said fire-pot and passing through the said vertical grate-openings *c* into chamber G. The said draft will rise no higher within said fire-pot than the height of the said vertical grate. This fire-pot and vertical grate-bars may be of any required thickness of material. The said reservoir or coal-supply chamber F is closely fitted at its lower end to the upper end of the said fire-pot E, and then firmly secured by means of bolts. At the bottom or lower end of the said vertical fire-grate there is a fire-grate, of any form of construction desired, upon which rests the coal within the fire pot and supply-chamber above as aforesaid.

The operation of this stove is as follows, to wit: The fire is kindled within the said fire-pot E; the said reservoir F is then filled with coal, and the cover I closed. The cover H may be left open for a short time until the fire is thoroughly kindled, so as to prevent any smoking, after which it is also closed. As the combustion continues, the fuel sinks down, all within the fire-pot E below the top of the said openings *c*, being fully ignited, having parted with its more inflammable portions while subjected to the heat of the fire immediately above the top of the said spaces in the said vertical fire-grate. At this point, and near the line *x x*, Fig. 2, the coal is fully ignited, although the consumption is somewhat slow, until in descending it reaches the top of the said vertical fire-grate, where it begins to consume more freely. The gases and products of imperfect combustion, which, having been collected within the supply-chamber and fire-pot, are forced out through the openings *c* in the said vertical fire-grate in an ignited form or state, aiding thereby the combustion of the remaining fuel, which always burns reluctantly unless subjected to a great draft and intense heat, and is easily extinguished when allowed to rest against the sides of an ordinary fire-pot. The incandescent coal and the burning of the gases within the chamber G not only create heat near the base of the stove, but also light up the chamber G and give the stove a cheerful appearance.

Having thus described my invention, what I claim, and desire to secure by Letters Patent of the United States, is—

The employment of a fire-pot having a vertical fire-grate around the same, forming a downward continuation of a coal-supply pot, in combination with a gas-consuming chamber between the outer case and the connected fire and coal supply pot, substantially as and for the purposes as herein described and set forth.

DENNIS G. LITTLEFIELD.

Witnesses:
JAMES B. SANDERS,
A. V. DE WITT.